J. F. MEADE AND E. V. CHURCH.
AIRPLANE FITTING.
APPLICATION FILED JAN. 22, 1919.
1,355,767.
Patented Oct. 12, 1920.
2 SHEETS—SHEET 1.
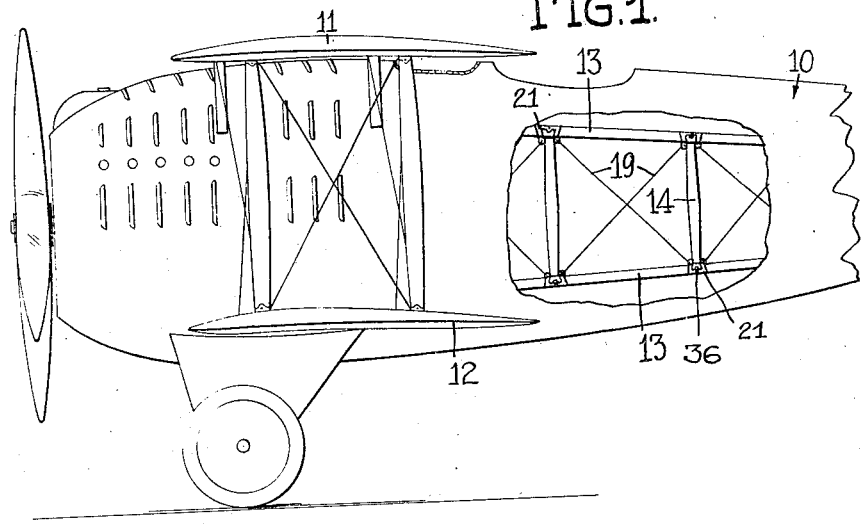
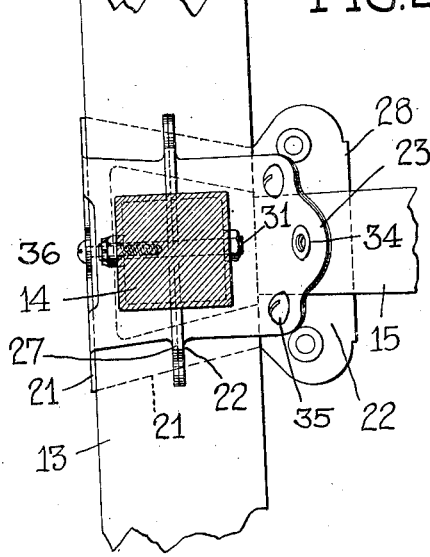
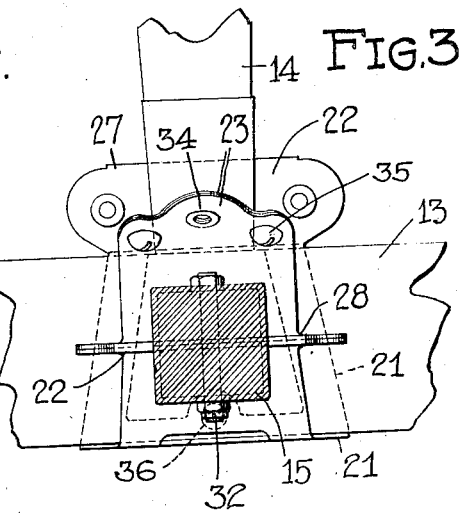
Inventors
Joseph F. Meade
Everett V. Church.
By their Attorney

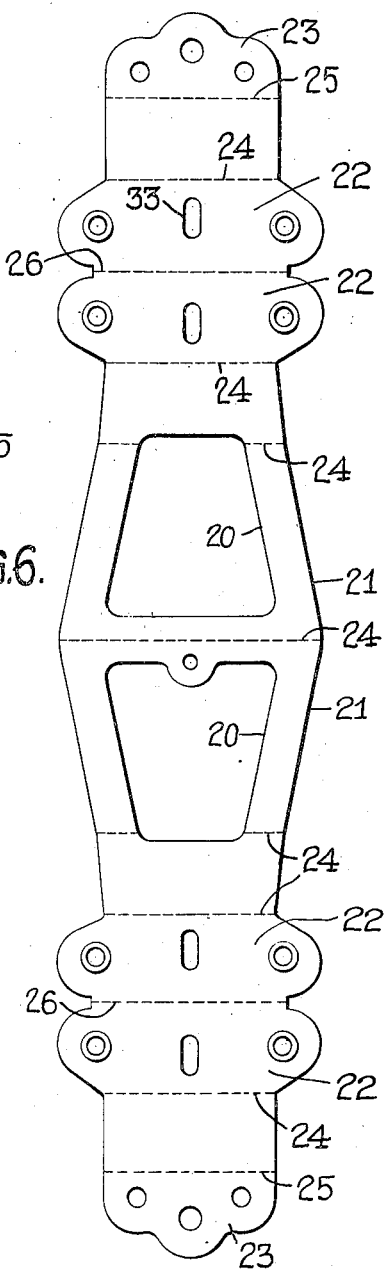
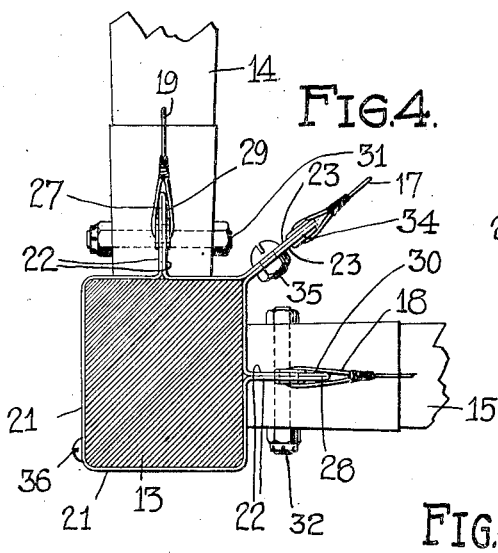
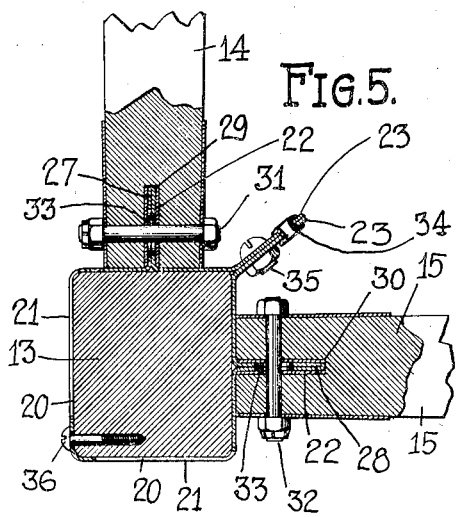
J. F. MEADE AND E. V. CHURCH.
AIRPLANE FITTING.
APPLICATION FILED JAN. 22, 1919.
1,355,767.   Patented Oct. 12, 1920.
2 SHEETS—SHEET 2.
Inventors
Joseph F. Meade
Everett V. Church
By their Attorney

UNITED STATES PATENT OFFICE.

JOSEPH F. MEADE, OF ROOSEVELT, AND EVERETT VAIL CHURCH, OF GARDEN CITY, NEW YORK, ASSIGNORS, BY MESNE ASSIGNMENTS, TO CURTISS AEROPLANE AND MOTOR CORPORATION, OF BUFFALO, NEW YORK, A CORPORATION OF NEW YORK.

AIRPLANE-FITTING.

1,355,767.     Specification of Letters Patent.     Patented Oct. 12, 1920.

Application filed January 22, 1919. Serial No. 272,509.

*To all whom it may concern:*

Be it known that we, JOSEPH F. MEADE and EVERETT V. CHURCH, citizens of the United States, residing at Roosevelt and Garden City, respectively, in the county of Nassau and State of New York, have invented certain new and useful Improvements in Airplane-Fittings, of which the following is a specification.

Our invention, an article of manufacture, is designed primarily as an aircraft fitting. More particularly it is designed as a truss fitting and is useful in connection with airplane wing structures, airplane fuselages and the like. In the design or formation of the fitting, provision is made for the rigid anchorage and connection of a plural number of struts or compression members and a plural number of tension members or wires—the former, in an airplane fuselage, consisting of the longérons and fuselage struts and the latter consisting of the tension stays. The tension stays or wires in an airplane fuselage usually cross connect opposite portions of the fuselage in three planes respectively at right angles to each other while the struts usually cross connect such portions in intersecting planes (two planes) also at right angles to each other. It is necessary therefore that provision be made in the design of the aforementioned fitting for the rigid and proper anchorage of all such connected parts.

Bearing in mind the above considerations it is proposed by the present invention: first, to provide suitable anchorages for the fuselage struts connecting with the longérons: second, to provide suitable anchorages for the tension stays or wires embodied in the fuselage truss; third, to so locate the anchorages that the stresses set up in the fuselage are carried to the neutral axes of the related fuselage parts; fourth, to construct the fitting in its entirety of a single piece of metal; fifth, to form certain of the anchorages by folding the body portion of the fitting upon itself and bending the folded portions at an angle; sixth, to form further anchorages by bringing the ends of the body portion together and bending such portions at an angle; seventh, to provide two thicknesses of metal for the several anchorages by forming them in the manner stated; eighth, to construct certain of the anchorages in a manner such that they jointly provide anchorages for the attachment of one strut and a plural number of wires; ninth, to construct the fuselage struts in such manner that the anchorages of the fittings connecting therewith engage in slots formed in the ends of the struts; tenth, to so form the end-slots that the anchorages seated therein extend off from the body portion of the fitting in the direction of the longitudinal extent of the struts; and eleventh, to extend the strut anchorages beyond the opposite lateral faces of the strut-ends whereby the extended portions provide the wire anchorages above mentioned. A fitting thus characterized is light, simple in design, strong, and a big improvement over existing fittings in that production cost is minimized. Moreover, a fitting of the type set forth is of a more or less universal character as regards its application to longérons of various thicknesses and to struts of different dimensions, without any necessity of the slightest alteration in the design of the fittings or a re-arrangement of the fuselage parts. Other advantages and improved results will be hereinafter more particularly set forth. A definition of the invention however will be found upon reference to the claims.

Of the drawings, wherein like characters of reference designate like or corresponding parts, Figure 1 is a side elevation of an airplane with a portion of the fabric covering of the fuselage removed. In this view the relation of the fittings to the longérons, struts and wires of the fuselage is shown.

Fig. 2 is an enlarged view of the fitting showing its relation to the longérons, struts and wires of the fuselage. In this view one of the vertical fuselage struts is shown in section.

Fig. 3 is a similar view showing one of the horizontal struts in section;

Fig. 4 is a similar view showing one of the longérons in section:

Fig. 5 is a view similar to Fig. 4 showing both the fitting and the longéron in section; and Fig. 6 is a plan view of the flat pattern or metal plate from which the fitting in its entirety is formed.

As intimated the fitting of our invention is equally as well applicable to the wing structure of an airplane as to the fuselage.

It is moreover useful as a fitting for truss structures other than airplanes and airplane parts. The fuselage however we have selected as illustrative of the one embodiment of our invention which we consider preferred.

In Fig. 1 of the drawings, 10 designates an airplane fuselage provided with intermediately located supporting surfaces 11—12. The fuselage, although designated as an entirety by the numeral 10, comprises the usual longérons 13, vertical fuselage strut 14, horizontal fuselage struts 15 and wires or tension stays 17, 18 and 19, the wires in each instance being arranged in the conventional manner, i. e., crossed. The wires 17 cross-brace the fuselage in the transverse vertical plane of corresponding vertically extending and horizontally extending struts, the wires 18 cross-brace the fuselage in the longitudinal horizontal plane of both the upper longérons and the lower longérons and the wires 19 cross-brace the fuselage in the longitudinal vertical plane of the longérons located on both the right and the left side of the fore and aft axis of the fuselage. Accordingly the fittings carried by the longérons and mounted at the strut ends should be provided with anchorages for the struts 14 and 15 and with additional anchorages for the wires 17, 18 and 19 which connect with the longérons 13 at the ends of related struts. In other words each fitting should be provided with at least two strut anchorages and at least five wire anchorages, for in the conventional "Pratt" truss it is customary to arrange the wires as stated.

In Fig. 6 of the drawings a fitting designed to accommodate the struts and wires connecting with the longérons at the various stations of the fuselage is shown. In this figure however only the outline of the fitting is disclosed. Preferably it (the fitting) is constructed of a single sheet or strip of high grade steel and is adapted to be stamped out or cut to form. After being stamped or cut out it is bent and folded as indicated in Figs. 4 and 5, the anchorages for the various fuselage parts being formed during the folding and bending operations. Again referring to the lay-out of Fig. 6, it will be noted that the fitting is symmetrical or nearly symmetrical about its transverse center line and adapted to be bent and folded in exactly the same manner. At or near said center line the strip or plate is lightened as indicated at 20, the lightened portion being wider than the remaining portions thereof. The relatively wide portions of the fitting at each side of the center line are designated as 21. From the ends of the portions 21 outwardly at each side of the center line the body plate or metal strip is of uniform width except for such portions of its length as are designated in Fig. 6 as 22. These portions 22 together with end portions 23 constitute the anchorage portions of the plate.

In shaping or forming the fitting the flat plate illustrated in Fig. 6 is bent upon the broken lines indicated in said figure. Upon the lines 24 the plate is bent at substantially a right angle, while upon the lines 25 it is bent at an angle of approximately 45°. Upon the lines 26 however the plate is abruptly bent at approximately a 360° angle whereby the portions 22 of the plate at opposite sides of the lines 26 lie flush one against the other. These portions 22 constitute the combined strut and wire anchorages of the fitting and are designated as 27 and 28 respectively in the drawings. Said anchorages 27 and 28, as above intimated, are relatively wide, i. e., of sufficient width to extend laterally beyond the opposite faces of the struts 14 and 15 with which they are directly associated. The ends of the struts 14 and 15 are slotted as indicated at 29 and 30 respectively to accommodate said anchorages, bolts 31 and 32 being provided as a fastening means for the struts. In this latter connection it will be noted that the anchorages 27 and 28 are each slotted as indicated at 33 and that these slots constitute bolt holes for the bolts 31 and 32. As the bolt holes 33 are hidden during the assembly of the fuselage they are made somewhat elongated to insure registry of the bolts therewith during assembly.

The end portions 23 of the fitting together constitute an anchorage 34 for the wiring 17 of the fuselage. Said end portions are fastened together as indicated at 35 which fastening means not only tends to hold the end portions 23 contiguous but tends also and actually does hold the fitting in its entirety tightly in place upon the longéron. The fitting, it will be noted, completely embraces the longéron and intermediately of its ends is provided with the anchorages 27 and 28 and at its ends is provided with the anchorage 34.

The anchorages 27 and 28 extend off from the longéron at a right angle and are each located in such relation to the longéron as to direct the stresses set up in the longéron due to the tension in the wires along its neutral axis. This is desirable for structural reasons. The location of the anchorage 34 is also such that the stresses set up in the longéron are carried to its neutral axis while the anchorages in each instance comprise two thicknesses of metal for added strength.

By seating the anchorages 27 and 28 in the slots 29 and 30 of the struts 14 and 15, the use of sockets in connection with the fitting is eliminated. Instead there is provided a simple connection and a connection which can be readily formed by simply folding the body plate of the fitting upon itself and bending it away from the remaining portion of the plate at an angle. The anchorages 27 and 28 are each designed to accommodate two of the tension stays or wires—the anchorage 27 admitting of the attachment of the wires 19 and the anchorage 28 admitting of the attachment of the wires 18. The anchorages for these wires are one and the same as the anchorages for the struts and are formed by simply extending the strut anchorages beyond the opposite lateral faces of the struts as indicated. This construction likewise tends to firmly seat the struts and at the same time directs the compression stresses set up in the struts themselves along their respective neutral axes. The fastening indicated at 36 may or may not be provided.

It is obvious that a fitting characterized as above set forth is applicable to trussed structures other than airplane fuselages. If used as a wing structure fitting the body plate or portion would embrace the wing beam, the anchorage 27 would be seated in a slot formed in a wing post or strut and the anchorage 28 would be seated in a compression member of the wing. The anchorage 27 moreover would provide for the attachment of the lift wires and drift wires of the wing structure, the anchorage 28 would provide for the attachment of the internal wing wiring and the anchorage 34 would provide for the attachment of the stagger wiring or, if used in connection with a triplane wing structure, a further and additional anchorage might readily be provided upon the opposite side of the fitting from that of the anchorage 27.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:

1. An airplane fitting comprising a one-piece metal body plate having anchorages formed thereon by bending the body upon itself, the anchorages thus formed being bent away from the remaining portion of the body plate to extend off therefrom at right angles to each other, and an anchorage formed on the body plate by bringing the ends thereof together, the anchorage thus formed being bent at an angle to the first mentioned anchorages less than a right angle.

2. A one-piece metal airplane fitting comprising a body plate bent intermediately of its ends to completely encircle an element of the airplane to which other and different elements of the airplane are attached, an anchorage for one of said elements formed upon the body plate by bringing the ends of the plate together and bending the ends away from the remaining portion of the body plate at substantially a 45° angle, and other and different anchorages for other and different elements of the airplane formed upon the encircling portion of the body plate by bending such portion upon itself and bending the bent portions at an angle to the element which the body plate encircles, said last mentioned anchorages being extended off from said element at right angles to each other.

In testimony whereof we hereunto affix our signatures.

JOSEPH F. MEADE.
EVERETT VAIL CHURCH.